United States Patent [19]
Raiko et al.

[11] Patent Number: 5,253,432
[45] Date of Patent: Oct. 19, 1993

[54] DRYING METHOD IN A POWER-PLANT PROCESS AND DRYER USED IN THE METHOD

[75] Inventors: Markku Raiko, Espoo; Martti Aijala, Helsinki; Ilkka Huttunen, Vantaa, all of Finland

[73] Assignee: Imatran Voima Oy, Finland

[21] Appl. No.: 854,316

[22] Filed: Mar. 19, 1992

Related U.S. Application Data

[63] Continuation of Ser. No. 466,406, Feb. 22, 1990, abandoned.

[30] Foreign Application Priority Data

Jun. 30, 1988 [FI] Finland .................. 883125
Jun. 30, 1988 [FI] Finland .................. 883126

[51] Int. Cl.$^5$ .................................. F26B 3/00
[52] U.S. Cl. ............................... 34/35; 34/86; 60/39.461; 60/39.55; 60/39.05
[58] Field of Search ............ 60/39.07, 39.05, 39.53, 60/39.55, 39.511, 39.461; 34/86, 35, 90, 22

[56] References Cited

U.S. PATENT DOCUMENTS

| | | | |
|---|---|---|---|
| 2,677,235 | 5/1954 | Secord | 60/39.53 |
| 2,677,237 | 5/1954 | Voysey | 60/39.46 |
| 2,775,823 | 1/1957 | Cremer et al. | 34/35 |
| 3,362,080 | 1/1968 | Daane | 34/35 |
| 4,295,282 | 10/1981 | Fox | 34/35 |
| 4,426,842 | 1/1984 | Collet | 60/39.53 |
| 4,780,965 | 11/1988 | Grafen et al. | 34/35 |

FOREIGN PATENT DOCUMENTS

| | | |
|---|---|---|
| 0129631 | 1/1985 | European Pat. Off. |
| 0278609 | 8/1988 | European Pat. Off. |
| 419974 | 9/1981 | Sweden |
| 1140757 | 1/1969 | United Kingdom |

Primary Examiner—Henry A. Bennet
Assistant Examiner—Denise L. Gromada
Attorney, Agent, or Firm—Steinberg & Raskin

[57] ABSTRACT

The invention concerns a method for the drying of a water-consuming material in a power-plant process. The water-containing material to be dried is introduced into a pressurized dryer (10) and thermal energy is supplied for the drying of the water-containing material. The steam produced in the drying is, at least partly, passed along a separate duct as injection steam into the combustion unit (13) of a gas turbine (14). The invention also concerns a dryer used in the method.

19 Claims, 3 Drawing Sheets

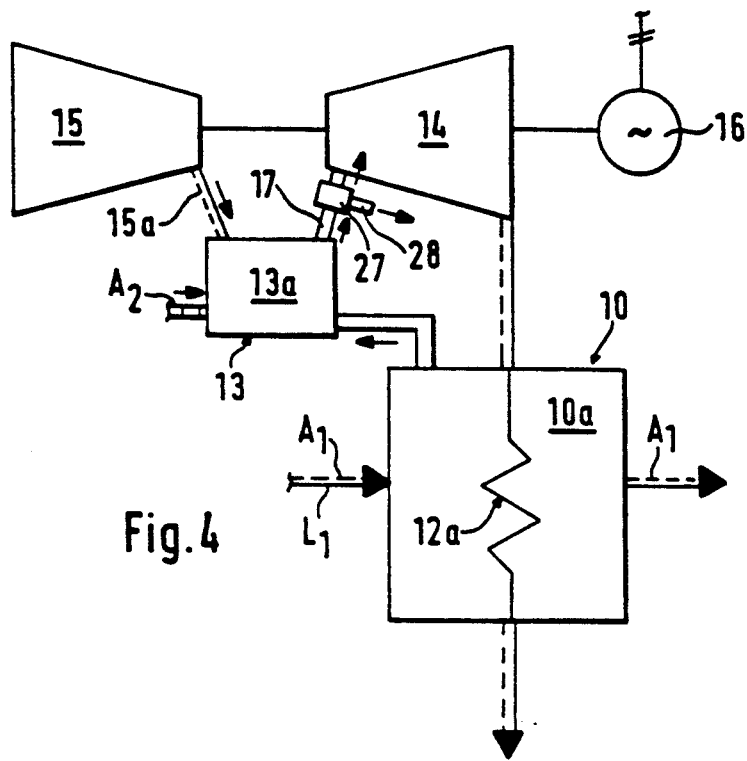
Fig. 4
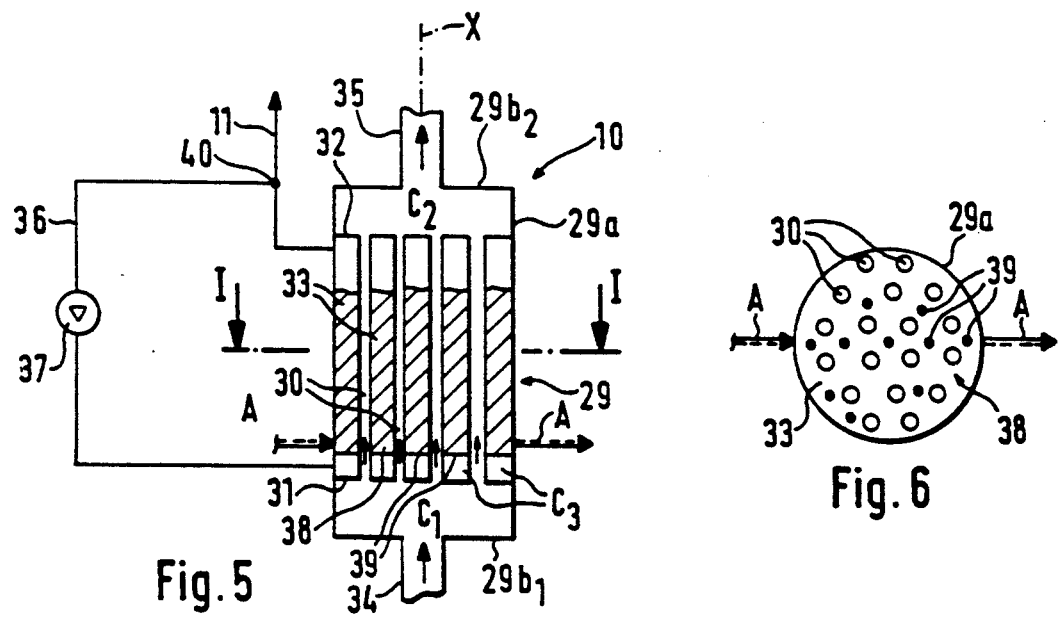
Fig. 5
Fig. 6

DRYING METHOD IN A POWER-PLANT PROCESS AND DRYER USED IN THE METHOD

This is a continuation, of application Ser. No. 07/466,406, filed Feb. 22, 1990 now abandoned.

The invention concerns a drying method in a power-plant process and a dryer used in the method.

At present, material that contains water is, as a rule, dried as unpressurized. Likewise, a fuel that contains water is burned as unpressurized, e.g., in a grate furnace, by dust burning, or by fluid bed combustion. In the prior-art solutions of equipment, the dryer process and the power-plant process are not interconnected in an optimal way in view of the overall efficiency of the process. The process connections between the dryers and the combustion equipment have not been carried into effect in the best way possible. The drying methods predominant to-day and the dryers employed in same are, on the whole, not suitable for pressurized combustion or gasification methods.

The present-day drying methods are uneconomical mainly because of the high cost of the pre-drying of wet fuel. Nor are the turbine and dryer solutions economical in their present forms.

At present, a solid material, e.g. peat, wood chips or coal, is dried as unpressurized. The burning takes place in a grate furnace, by dust burning or by fluid bed combustion. In more advanced gas-turbine power plants, water steam is fed as injection steam into the gas turbine. Thereat both the mass flow through the gas turbine and the specific heat of the gas become higher, and the output obtained from the shaft of the gas turbine and the efficiency of the process are increased. However, the prior-art solutions do not permit an optimal efficiency for the drying and for the whole process.

The object of the invention is to find an improvement for the drying of a water-containing material. In the invention it has been realized to form the dryer as a pressurized dryer, the steam produced in the drying in said dryer being passed as injection steam to a gas turbine. The steam produced in the pressurized dryer is passed into the combustion chamber of the gas turbine, where it substitutes for part of the air arriving through the compressor. At the same time, the power requirement of the compressor is reduced and an increased proportion of the turbine output is converted to generator power. The net output obtained from the gas turbine is increased even by about 40 percent. Thereat, the efficiency of the gas turbine is increased by about 25 percent as a result of the fact that the ultimate temperature of the flue gases is lowered.

An abundance of air is needed because by its means the temperature in the combustion chamber is kept at the desired level, i.e. at a level that is tolerated by the materials. When air is substituted for, for the purpose of cooling, by steam, the power required for the compressing of the air becomes lower, and more power is available to the generator. The generation of steam requires thermal power, and some energy is required for operation of the pump in order to pump the water entering into the vaporizer. The energy required by the pump is, however, just a fraction of what would be required by compressing.

According to the invention, the injection steam is generated from the water obtained from the material dried in the pressurized dryer, and the thermal energy required for said drying is advantageously supplied from waste heat obtained from elsewhere in the process, e.g. from the waste heat in the combustion gases of a gas turbine.

According to the invention, a solid, sludge-like or liquid material is dried by means of the device by circulating the steam produced in the drying so that at least part of the steam produced out of the fuel is passed back into the dryer, and by means of said steam the material to be dried is fluidized or made to bubble. In the solution in accordance with the invention, the supply of energy to the dryer takes place at least partly through tubes placed in the layer to be dried by making a gaseous material, e.g. flue gases of the gas turbine, flow in the tubes. When a gaseous material is made to flow, no change in phase takes place in said medium.

At least part of the steam produced in the drying is passed as injection steam to the gas turbine into its combustion device.

The method in accordance with the invention for the drying of a material that contains water is mainly characterized in that the water-containing material to be dried is introduced into a pressurized dryer and thermal energy is supplied for the drying of the water-containing material, whereby the steam produced in the drying is, at least partly, passed along a separate duct as injection steam into the combustion unit of a gas turbine.

The dryer in accordance with the invention is mainly characterized in that the dryer comprises an inner space in a pressurized dryer, into which the water-containing material to be dried is passed, and that the dryer comprises means for the transfer of the thermal energy required in the drying to the material to be dried, and that, out of the inner space in the dryer, into which the water-containing material to be dried has been supplied for drying, a connecting duct is provided for passing the steam produced in the drying into a gas turbine as injection steam.

In the following, the invention will be described with reference to some advantageous embodiments of the invention illustrated in the figures in the accompanying drawing, the invention being, however, not supposed to be confined to said embodiments alone.

FIG. 4 is a schematical illustration of a process in which a dryer in accordance with the invention and a method in accordance with the invention for the drying of a water-containing material are used.

FIG. 5 is a cross-sectional view of a dryer in accordance with the invention.

FIG. 6 shows a section taken along the line I—I in FIG. 5.

Figure 1:
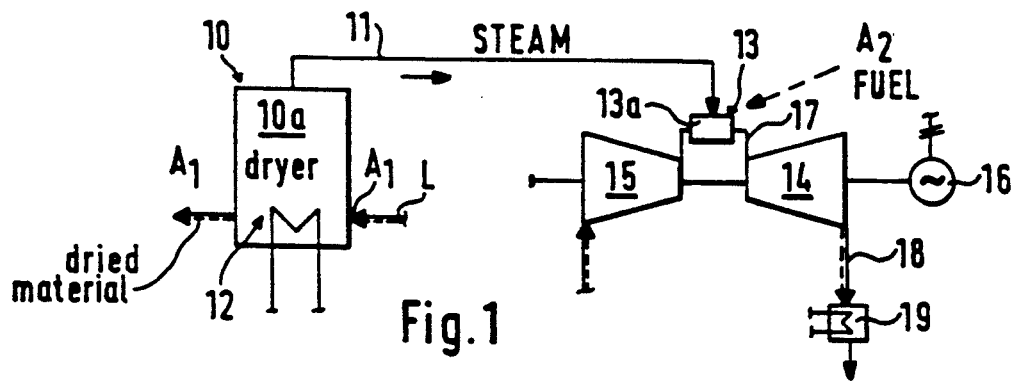
FIG. 1 is a schematical illustration of an industrial process which comprises a pressurized dryer and a gas turbine which produces electricity.

As is shown in FIG. 1, the water-containing material A to be dried is passed in the way denoted by the arrow L into the pressurized dryer 10. In the present application, pressurization means that a positive pressure, in relation to the atmospheric pressure, has been produced into the dryer 10 by means of generation of steam. The positive pressure is typically within the range of 5 ... 50 bars. The thermal energy is passed into the heat exchanger 12, and the thermal energy is transferred into the material to be dried. On the whole, it is possible to use any water-containing material to be dried whatsoever. The drying takes place in the dryer 10 at the pressure of the combustion chamber of the gas turbine. The moisture contained in the material $A_1$ to be dried is obtained as a medium in the process by passing it along the duct 11 into the combustion chamber 13$a$ in the combustion or gasification device 13. In the pressurized dryer 10, the moist material is dried, e.g., to a moisture content of 20%. The combustion device 13 can be accomplished with clean fuel or with fuel that contains ashes, either with direct combustion, or such a solution is also possible wherein direct combustion is replaced by gasification or partial gasification of the fuel and by combustion of the gas produced.

The steam that is passed from the dryer 10 along the duct 11 is, thus, passed into the combustion chamber 13$a$ in the combustion unit 13 of the gas turbine 1. In the combustion chamber 13$a$, said steam is substituted for part of the air that arrives through the compressor 15. At the same time, the power requirement of the compressor 15 is reduced, and an increased proportion of the output of the gas turbine is converted to generator 16 power.

An abundance of air is needed because by its means the temperature in the combustion chamber 13$a$ is kept at the desired level, i.e. at a level that is tolerated by the materials. When air is substituted for, for the purpose of cooling, by steam, the power required for the compressing of the air becomes lower, and more power is available to the generator. The generation of steam requires thermal power.

From the dryer 10 the dried material $A_1$ is transferred to other use in an industrial process, e.g. to constitute raw-material for particle board or directly to some boiler furnace of an industrial process and/or to the combustion device 13 shown in FIG. A and provided for the gas turbine 14, in which case the material $A_1$ is material $A_2$. The dryer 10 may also operate as the dryer for an intermediate or final product of some industrial process.

The combustion device 13 comprises a combustion chamber 13$a$ pressurized by means of a compressor 15. The compressor 15 produces the necessary combustion air, which is passed into the combustion device 13 through a system of compressed-air pipes 11. The compressor 15 raises the pressure, e.g., to about 12 bars, an equally high pressure being also produced by means of generation of steam in the dryer 10 in its inner drying space 10$a$. At said pressure, the air is then passed into the combustion device 13 into its combustion chamber 13$a$. As a result of the combustion of the fuel $A_2$, the mixture of air and of the flue gases produced during combustion of the fuel is heated to about 850° ... 1200° C. At least part of the steam that was separated from the wet material $A_1$ introduced into the dryer 10 is passed into the combustion device 13 into its combustion chamber 13$a$ along the steam pipe 11. The objective of the supply of steam is regulation of the ultimate temperature in the combustion chamber, whereby it replaces some of the excess air that is normally required. Owing to the supply of steam, the compressor power is reduced and the net output of the process becomes higher.

The flue gases are passed further along the flue-gas pipe system 17 to the gas turbine 14, where the gases expand and generate kinetic energy. By means of the kinetic energy, the compressor 15 placed on the same shaft as well as the generator 16 are rotated, said generator producing electricity. The output obtained from the gas turbine 14 is higher than the power required by the compressor 15, the extra output being recovered from the generator 16 of the gas turbine 14. After the gas turbine 14, the flue gases are passed along the duct 18 to a separate waste-heat recovery device 19, e.g. to a waste-heat boiler.

The invention can also be applied to a combined power plant which includes a steam turbine that produces electricity, in addition to a gas turbine. In such a case, the thermal energy required for drying can be taken exclusively or partly from bled steams of the steam turbine.

Figure 2:
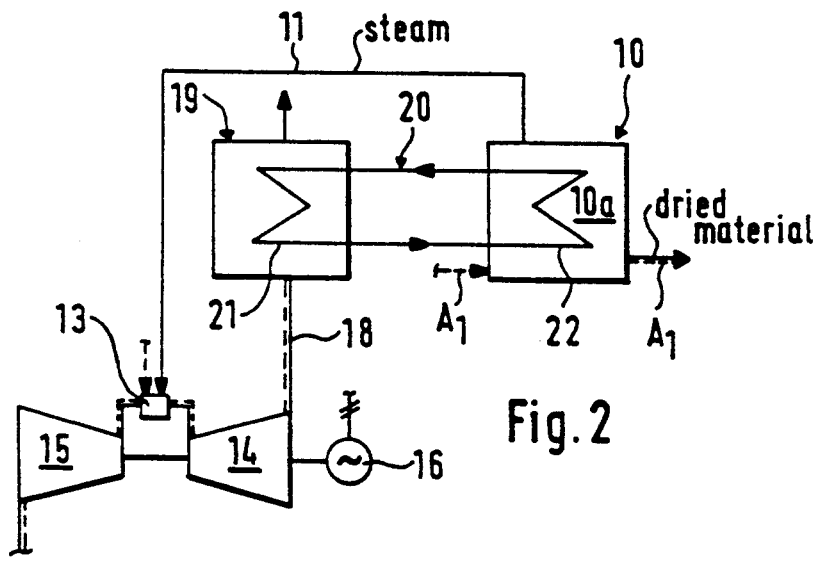
FIG. 2 is a schematical illustration of a combination of a pressurized dryer and a gas turbine, wherein the waste heat of the flue gases from the gas turbine is utilized in the drying of a water-containing material for the industrial process.

In FIG. 2, an embodiment of the invention is shown in which the device 19 for recovery of the heat from the flue gases after the gas turbine is used as a source of the energy passed to the pressurized dryer 10. Between the pressurized dryer 10 and the heat-recovery device 19 there is a heat-transfer circuit 20. In the heat-transfer circuit 20, it is possible to circulate, e.g., water. From the flue gases, the heat is transferred in the waste-heat boiler, in the heat exchanger 21, into the water in the circuit 20, and the water is circulated in the dryer 10, in its heat exchanger 22, whereby the thermal energy obtained from the flue gases is transferred in the heat exchanger 22 into the material $A_1$ to be dried. The steam produced in the dryer 10 is passed further along the duct 11 into the gas turbine 14, into its pressurized part, into the combustion or gasification device 12, to constitute injection steam.

Figure 3:
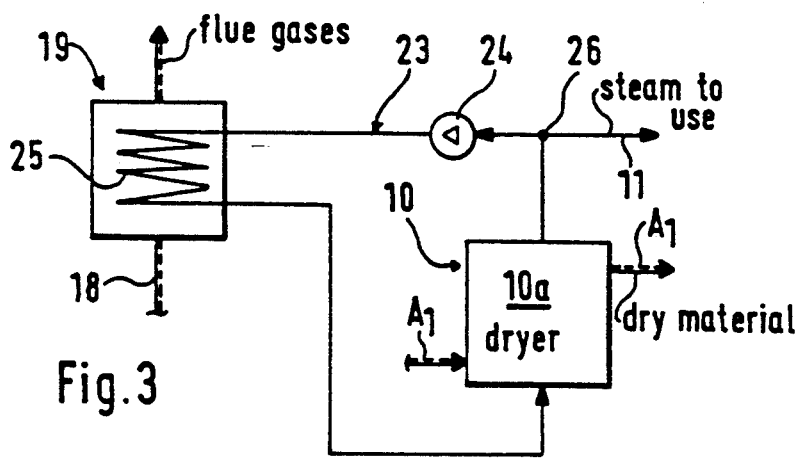
FIG. 3 illustrates a connection between a dryer and a heat-recovery device connected to the flue-gas duct, which said connection can be applied, e.g., to the embodiment shown in FIG. 2.

FIG. 3 shows a third advantageous embodiment of the invention. The water-containing material $A_1$ is passed into the pressurized dryer 10, and the material is fluidized by means of the circulation steam in a steam atmosphere. The steam produced in the drying is circulated in the circuit 23 by means of a steam blower 24. The steam is circulated through the heat exchanger 25, which is fitted in the heat-recovery device 19, e.g. in a waste-heat boiler for flue gases. The dried material $A_1$ is removed from the top portion of the dryer 10. Part of the steam is taken from the circuit 23 for circulation of the heat-transfer medium through the distribution point 26 into the duct 11 and further to other use, e.g., exactly for injection steam for the gas turbine 14. In the dryer 10 itself, in its drying space 10$a$, no separate heat-exchanger pipe systems are needed.

FIG. 4 shows one mode of operation of a dryer in accordance with the invention as a process chart. In the way shown by the arrow $L_1$, the water-containing material $A_1$ is passed into the dryer 10. The thermal energy is passed along the duct 12 into the heat exchanger 12$a$, and the thermal energy is transferred into the material to be dried. As the material to be dried, it is possible to use, e.g., milled peat of a moisture content of 70 percent. On the whole, in a dryer in accordance with the invention, it is possible to use any water-containing material to be dried. The moisture contained in the material $A_1$ can be included in the process as a medium by passing it along the duct 11 into the combustion chamber 13$a$ in the combustion or gasification device 13. When the material $A_1$ to be dried is fuel $A_2$, it can be used as fuel for the gas turbine 14.

The injection steam is passed along the duct 11 into the pressurized part of the combustion or gasification device 13, advantageously into the combustion chamber 13a. The steam substitutes for part of the air arriving through the compressor 15. At the same time, the power requirement of the compressor 15 becomes lower, and an increased proportion of the output of the gas turbine 14 is converted to generator 16 power. The compressor 15 produces the necessary combustion air, which is passed into the combustion device 13 through a compressed-air pipe system 15a. The compressor 15 raises the air pressure, e.g., to 12 bars. At said pressure, the air is then passed into the combustion device 13 into its combustion chamber 13a.

Owing to the burning of the fuel A, the temperature of the mixture of air and of the flue gases produced on combustion of the fuel rises to about 850° ... 1200° C. Into the combustion device 13, into its combustion chamber 13a, along the duct 11, at least part of the steam is introduced that was separated in the dryer 10 from the water-containing material $A_1$.

One objective of the supply of steam is to regulate the ultimate temperature in the combustion chamber, whereby the steam substitutes for the excess air that is normally needed. Thus, the temperature in the combustion chamber 13a is kept at a level that is tolerated by the materials. Under these circumstances, when air is being substituted for by steam for the purpose of cooling, the power needed for compression of air is lowered, and more power remains available to the generator 16. Part of the ashes from the fuel A is removed out of the combustion device 13 along ducts straight out of the system. Part of the flue gases are passed to the hot cleaner 27 for flue gases, from which the more contaminated gas and the ashes are removed through an outlet duct 28. The purer gas is passed along the duct 17 further into the gas turbine 14, where the gases expand and generate kinetic energy. By means of the kinetic energy, the compressor 15, placed on the same shaft, as well as the generator 16, which produces electricity, are rotated. Having accomplished the work mentioned above, the pressure of the flue gases is lowered to the level of the atmospheric pressure. The output obtained from the gas turbine 14 is higher than the power required by the compressor 15, whereby the extra power can be recovered from the generator 16 of the gas turbine 14.

The dryer 10 is advantageously pressurized, which means, in the present application, that the drying in the drying space in the dryer takes place at a positive pressure relative the atmospheric pressure. The pressure range is typically 5 ... 50 bars.

FIG. 5 shows a dryer in accordance with the invention as an illustration of principle and as a cross-sectional view. The dryer 10 comprises an outer mantle 29, advantageously consisting of a circular cylindrical mantle portion 29a and of end parts $29b_1$ and $29b_2$. The longitudinal axis X of the dryer is vertical. Inside the mantle 29 of the dryer 10, heat transfer tubes 30 are fitted. The heat transfer tubes 30 are fixed at their ends, in the lower part of the dryer to the perforated plate 31 and in the upper part of the dryer to the perforated plate 32. Between the cylindrical mantle portion 29a of the dryer 10, the heat transfer tubes 30, and the plates 31 and 32, a space 33 remains for the material A to be dried. The heat transfer medium, advantageously the flue gases of the gas turbine 14, is passed along the duct 34 into the space $C_1$ between the plate 31 and the end part $29b_1$ of the mantle portion of the dryer, from which space the flue gases pass along the straight tubes 30 into the space $C_2$ between the other plate 32 and the end part $29b_2$ and further along the duct 35 out of the dryer 10. The heat is transferred out of the flue gases into the material A to be dried. The steam that is produced in the drying out of the material A that contains water, e.g. fuel, is passed along the duct 36 from the top portion of the space 33, being circulated by the steam blower 37, back into the dryer 10 into the bottom portion of the space 33. By means of said steam produced out of the material to be dried, the material A to be dried is fluidized or made to bubble. The material A is passed into the space 33 onto the nozzle plate 38. The steam is passed along the duct 36 into the space $C_3$ between the plate 31 and the nozzle plate 38, from which space it is passed through the nozzle openings 39 into the material A to be dried, present in the space 33. Through the nozzle openings 39, the steam is distributed uniformly into the material to be dried. When the steam is passed from underneath into the material layer to be dried, the material A to be dried, placed on the plate 38, is fluidized or made to bubble.

The steam circulation circuit 36 is provided with a branching point 40 for passing steam along the duct 11, at least partly, to other useful use, e.g. in the process of FIG. 4 to the gas turbine 14 into the pressurized part of the gas turbine, advantageously into its combustion unit 13 or gasification unit as injection steam. The steam and its energy can also be utilized otherwise. The steam can be passed, e.g., into superheaters in the steam circuit of a steam turbine process, into heat exchangers, etc.

FIG. 6 is a sectional view taken along the line I—I in FIG. 5. The water-containing material to be dried is introduced into the space 33 between the dryer mantle 29a and the heat transfer tubes 30. The heat transfer tubes 30 are advantageously straight tubes, whereby flow losses are minimized. The space 33 is advantageously pressurized, e.g., to a pressure of 12 bars. In said space, the material to be dried is substantially in a steam atmosphere.

Figure 7:
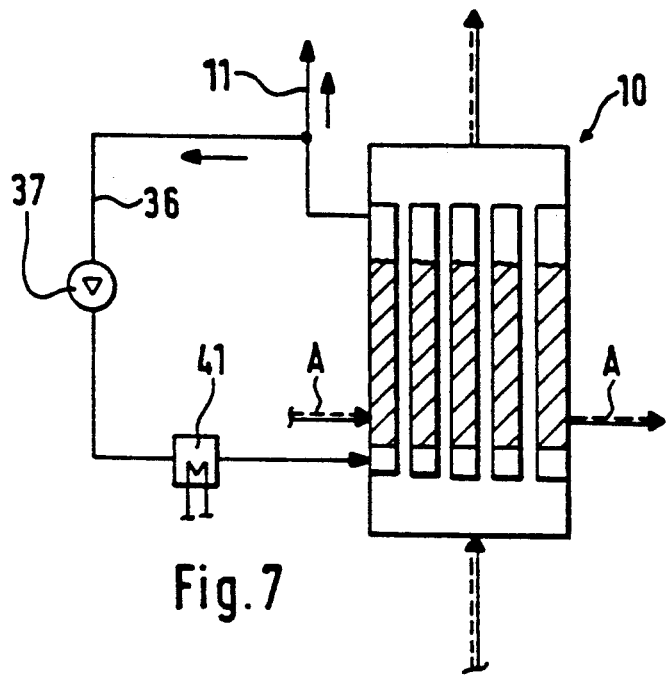
FIG. 7 shows an embodiment of the invention wherein a superheater is fitted in the steam circulation circuit.

FIG. 7 shows an embodiment of the invention wherein steam of the steam circulation circuit 36 is superheated in a superheater 41. The energy for the superheating can be obtained either from the exhaust gases of the gas turbine process, from the intercooling of the compressor, or from somewhere else.

In the figures referred to above, such an embodiment is possible in which the tubes 30 passing through the layer 33 to be dried are at least partly insulated so as to restrict the surface temperature at the contact point between the material to be dried and the tube 30. Advantageously, this insulation is carried out at the tube portions at which the temperature of the flue gases is highest.

Figure 8A:
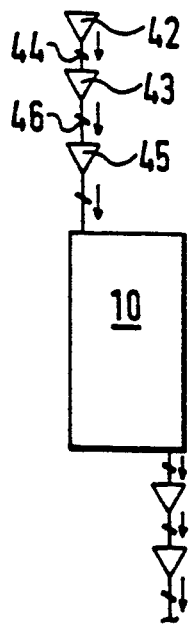
FIGS. 8A to 8C illustrate arrangements for the introduction of the material to be dried into the dryer.

FIG. 8A shows a solution for the feed and removal of the fuel in a dryer which comprises a vertically mounted cylindrical mantle and heat transfer tubes 30 passing through same. FIG. 8A shows the feed of a solid material to be dried into the pressurized dryer 10. The feed takes place as follows. The solid material is fed into an unpressurized feed silo 42. Out of the feed silo 42, the material to be dried is made to flow by the effect of gravity into the tank 43 placed underneath, which operates as unpressurized or pressurized, as is necessary. Between the tanks there is a pressure-tight closing device 44. Out of this tank 43, the material to be dried is made to flow further into the next tank 45, which is all the time under pressure. Before the flowing of the material starts, the pressure level in the intermediate tank must be raised to the same level at which the pressure in the dryer is. Between the tanks there is a pressure-tight closing device 46. After the intermediate tank has been emptied, the closing member placed at its bottom side is closed, and the pressure in the intermediate tank is discharged. The valve placed above the intermediate tank is opened to fill the intermediate tank. The removal of the dry material out of the device takes place by means of devices similar to those used for the feed, only the sequence of the operations is reversed.

Figure 8B:
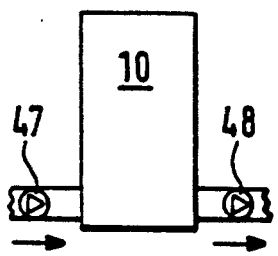

FIG. 8B shows a solution for the feed and removal of a sludge-like material into and out of the dryer. The sludge-like material is introduced by means of the pump 47 and removed by means of the outlet pump 48 along ducts of its own.

Figure 8C:
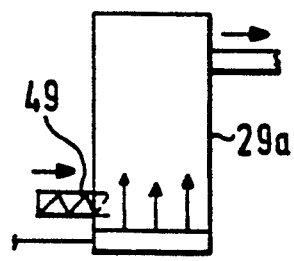

FIG. 8C shows a solution for the introduction of a material to be dried that must be fluidized into the dryer 10. The material is passed by means of a screw conveyor 49 through the dryer mantle 29a, and the dried material is removed from the top portion of the dryer from above the fluid bed. It is an advantage of this solution that in the fluidization any heavy particles of impurities remain on the bottom of the fluid bed and can be removed from there separately.

What is claimed is:

1. Method for drying a water-containing material in a power-plant process, comprising
    introducing a water-containing material to be dried into a pressurized space within a dryer,
    supplying thermal energy to the pressurized dryer to dry the water-containing material,
    drying the water-containing material substantially in a steam atmosphere,
    connecting the dryer to a combustion unit of a gas turbine by means of a connecting duct,
    generating injection steam in the dryer by pressurizing at least part of the steam, and
    passing only the injection steam directly from the dryer through said connecting duct into the combustion unit.

2. The method of claim 1, further comprising introducing a positive pressure of about 5 to about 50 bars into the dryer.

3. The method of claim 1, further comprising generating the thermal energy needed for the drying of the material from waste heat in flue gases of the gas turbine or from bled steams of a steam turbine.

4. The method of claim 1, further comprising circulating the steam produced in the dryer through a waste-heat boiler wherein the steam is superheated, and recirculating the steam among the material to be dried in the dryer to deliver thermal energy to the drying of the fuel.

5. The method of claim 1, further comprising
    passing the water-containing material into the pressurized space in the dryer, said space being defined by heat transfer tubes,
    flowing flue gases from the gas turbine through said tubes,
    transferring the heat from said gases into the material to be dried such that the material to be dried is dried substantially in a steam atmosphere,
    circulating the steam in a steam circulation circuit, and
    passing at least part of the steam as injection steam into the gas turbine to produce electricity.

6. The method of claim 1, further comprising superheating the circulation steam by means of a superheater arranged to heat the steam before the steam is transferred into the pressurized space of the dryer.

7. The method of claim 5, further comprising passing the circulation steam through nozzle openings in a nozzle plate arranged underneath the material to be dried such that the material is made to bubble and fluidize in the steam atmosphere.

8. The method of claim 1, wherein said duct has a first and second end, said first end being connected to said dryer and said second end being connected to said combustion unit.

9. The method of claim 1, further comprising removing the dried material from said dryer such that it does not pass through said duct.

10. An arrangement in a power plant used in the drying of a water-containing material, comprising
    a pressurized dryer including an inner space into which a water-containing material to be dried is passed,
    means for transferring thermal energy to said water-containing material in said inner space substantially in a steam atmosphere to dry the water-containing material being passed therethrough, such that steam is produced, at least part of the steam in said dryer being pressurized to produce injection steam, and
    a connecting duct connecting said inner space of said pressurized dryer to a combustion unit of a gas turbine, said duct structured and arranged to pass only the injection steam produced in the dryer directly into said combustion unit.

11. The arrangement of claim 10, wherein the dryer further comprises a heat-transfer circuit for transferring heat from exhaust gases of the gas turbine or from bled steams of a steam turbine to the pressurized dryer.

12. The arrangement of claim 10, wherein said means comprise a heat-recovery device, the arrangement further comprising
    a steam-circulation circuit arranged between the heat-recovery device and the pressurized drying space,
    a steam blower for passing the steam produced in the drying of the water-containing material into the heat-recovery device, and then into the inner space for the drying of the material, and
    an additional duct connecting said steam-circulation circuit to the gas turbine such that at least part of the steam is passed from the steam-circulation circuit to the gas turbine through said additional duct.

13. The arrangement of claim 10, further comprising
    heat transfer tubes being defined in said inner space, flue gas flowing through said heat transfer tubes such that the heat in the flue gas is transferred to the drying process,
    a steam circulation circuit for circulating at least part of the steam produced from the material to be dried into the inner space, and
    at least one duct for passing the steam produced in said space as injection steam to the gas turbine to produce electricity.

14. The arrangement of claim 12, wherein said steam circulation circuit includes a branch duct through which at least part of the steam is transferred to the rest of the power-plant process for utilization of the energy contained in the steam.

15. The arrangement of claim 10, further comprising a nozzle plate, through which the steam is passed into the space inside the dryer so as to fluidize or bubble the material to be dried.

16. The arrangement of claim 13, wherein the dryer comprises substantially straight heat transfer tubes fixed to plates so as to continuously direct the flow of exhaust gases, first into the space between the plate in the dryer and the end part of the dryer and out of said space through the tubes into the space between the plate and the other end part of the dryer and along the duct out of the dryer.

17. The dryer of claim 10, wherein said duct has a first and second end, said first end being connected to said dryer and said second end being connected to said combustion unit.

18. The dryer of claim 10, wherein said dried material is removed from said dryer such that it does not pass through said duct.

19. The dryer of claim 10, wherein the pressure of the injection steam being passed through said duct into said combustion unit is substantially the same as the pressure in said combustion unit.

* * * * *